United States Patent [19]

Bauer

[11] Patent Number: 5,100,228

[45] Date of Patent: Mar. 31, 1992

[54] CASE FOR A CAMERA

[76] Inventor: Fritz Bauer, Pummergasse 20, A-3002 Pukersdorf, Austria

[21] Appl. No.: 657,044

[22] Filed: Feb. 19, 1991

[30] Foreign Application Priority Data

Feb. 20, 1990 [AT] Austria .................................. 386/90

[51] Int. Cl.⁵ ............................................. G03B 23/02
[52] U.S. Cl. ........................................ 352/72; 352/75; 352/242
[58] Field of Search ...................... 352/72, 75, 76, 77, 352/242

[56] References Cited

U.S. PATENT DOCUMENTS

| | | | |
|---|---|---|---|
| Re. 32,138 | 5/1986 | Gottschalk | 352/72 |
| 1,512,477 | 10/1924 | Nelson | 352/75 |
| 2,597,176 | 5/1952 | Pettus | 352/75 |
| 2,752,107 | 6/1956 | Schenk | 352/75 |

Primary Examiner—Monroe H. Hayes
Attorney, Agent, or Firm—Cushman, Darby & Cushman

[57] ABSTRACT

A case for a film camera with a film magazine which can be mounted at various positions. The case comprises at least one opening to allow passage of the film, an insertion holder for receiving essentially diametrically opposed, formed shoulders of the film magazine and comprises a lock for the latter. In order to make it possible to re-mount the film magazine in a simple manner, provision is made that the case comprises only one opening to allow passage of the film. Also, two different receiving parts are provided which can be selectively fastened to the outside of the case for covering a part of the film. Passage opening and which are provided with a clamping device for fixing the film magazine.

5 Claims, 6 Drawing Sheets

CASE FOR A CAMERA

BACKGROUND OF THE INVENTION

1. Field of the Invention

The invention relates to a case for a film camera with a film magazine which can be mounted at various positions. The case comprises at least one opening for the passage of the film, an insertion holder for receiving essentially diametrically opposed, formed shoulders of the film magazine and a lock for the latter.

2. Description of Related Art

Such a case is known from U.S. Pat. No. 4,082,436. In this known case, two openings for the passage of the film are provided, one of which is located on the back wall of the case and the other on the top of the case. Insertion holders are located in the area of the two openings which holders have the function of selectively receiving a film magazine.

However, this results in the disadvantage that the particular opening which is not used for receiving the magazine must be closed with a cover and further results in a concomitant expense for tightness against light, dirt and sound.

SUMMARY OF THE INVENTION

The invention overcomes these disadvantages by providing a case of the initially mentioned type which is distinguishable by simple additional design.

The invention solves this problem in the following manner. The case comprises only one opening for the passage of the film and provides two different receiving parts which can be selectively fastened to the outside of the case for covering a part of the opening for the passage of the film and which are provided with a clamping device for fixing the film magazine.

As a result of this very simple design changing the mounting site of the film magazine on the case can be performed very easily.

The components of the case can be designed as desired and do not constitute subject matter of the invention. Thus, the components of the case can be designed in accordance with U.S. Pat. Nos. 4,536,066; 4,402,581, 4,320,942 and 4,218,116.

In addition, a screw which can be inserted into a tapped hole of the case for fixing the receiving parts to the case can also be provided.

This achieves very reliable anchoring of the receiving part to the case.

Another feature of the invention provides that one of the receiving parts is designed essentially as an angle piece whose shanks form an angle which corresponds to the angle between the back wall and upper surface of the case. The one shank comprises fitting areas which correspond to fitting areas of the case and the shank of the receiving part can be inserted into the opening of the case, partially covering the opening.

As a result, a corresponding area of the opening of the case is kept free in order to allow for passage of the film and, support of the film magazine is assured on the section of the receiving part which engages in the opening of the case. As stated, the receiving part can be securely anchored to the case with a fastening screw.

A further feature of the invention provides that one of the receiving parts is designed essentially in a T shape with the central bar forming an angle with its cross beam. This angle corresponds to the angle between the back wall and top of the case and insertion holder on its free end. An insertion holder for receiving the film magazine and a clamping device for the film magazine are located on the cross beam. The receiving part has a perforation allowing for the passage of the film. This receiving part also can be secured to the case with a fitting screw.

The invention will now be explained in more detail with reference made to the drawings.

DETAILED DESCRIPTION OF THE PREFERRED EMBODIMENTS

Figure 1:
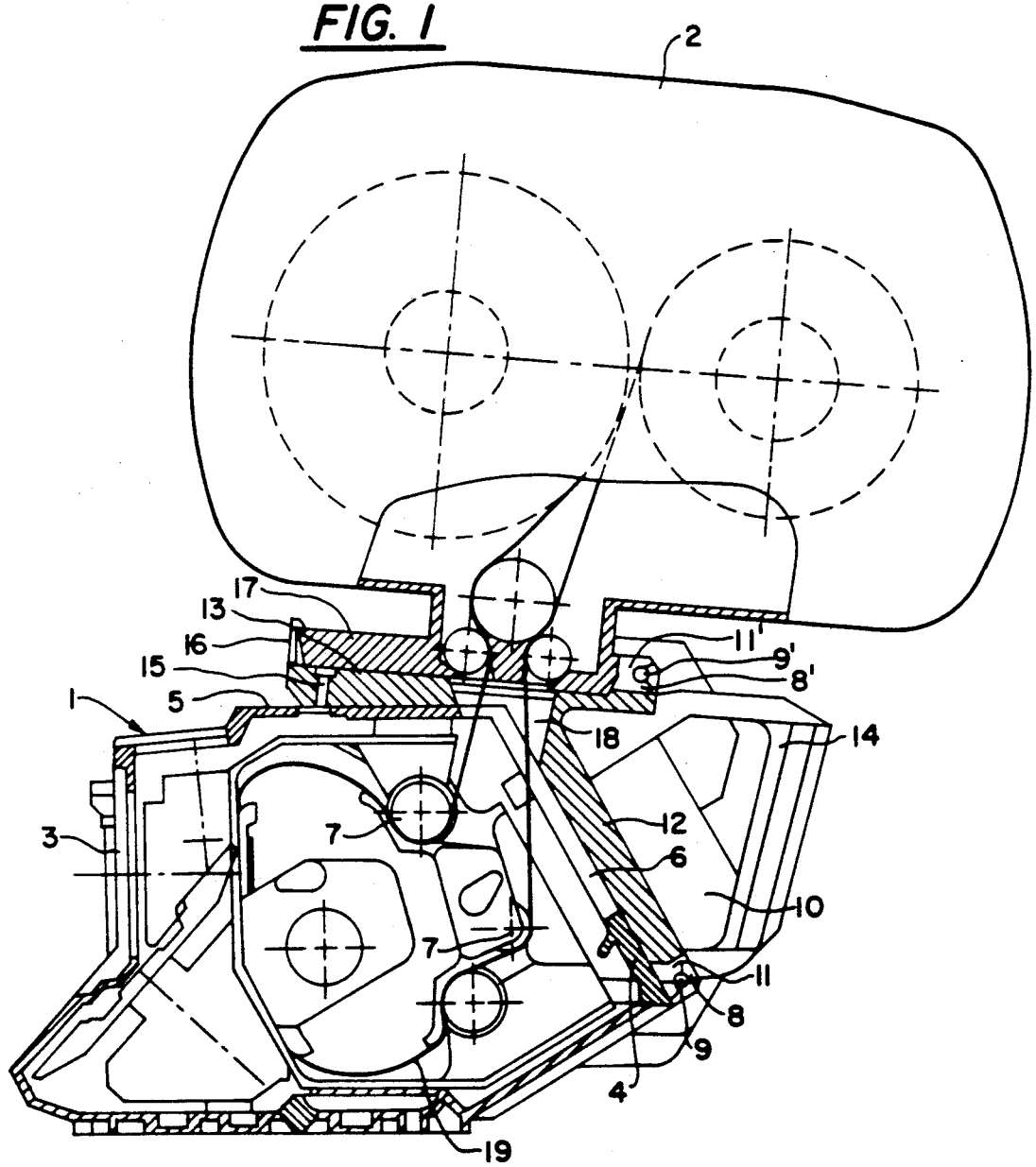
FIG. 1 shows a section of case with a film magazine mounted on its top.

FIG. 1 shows a case 1 in accordance with the invention with a film magazine 2 mounted on its top. The lens, which can be inserted into receptacle 3, is not shown.

Case 1 comprises opening 6 in the area of back wall 4. The opening also extends into the area of upper wall 5.

The customary components such as film guide 7 with drive, grasping mechanism, etc. are housed inside the case. These components can be designed in a customary manner, according to U.S. Pat. Nos. 4,536,066, 4,402,581, 4,320,942 and 4,218,116 and do not constitute part of the invention.

An insertion holder in the form of a shaft 9 held between two flaps 8 (only one shown) is located in the lower area of back wall 4 onto which receiving part 10 with essentially diametrically opposed, formed shoulders 11 is mounted.

This receiving part 10 is essentially T-shaped. The central bar 12 forms an angle with cross bar 13 which corresponds to the angle between back wall 4 and upper wall 5. Central bar 12 covers the greatest part of opening 6. A handle 14 is formed on this bar 12.

Cross bar 13 of receiving part 10 rests lens receptacle 3 on upper wall 5 of the case and is fixed to the upper wall by means of screw 15.

Shaft 9' held between flaps 8' (only one shown) formed on cross bar 13 is located at the one end of cross beam 13. Shaft 9' functions as insertion holder for film magazine 2. Clamping hook 16, which can pivot about a shaft on cross beam 13, is located on the end of cross beam 13 opposite to flap 8' and is designed to clamp film magazine 2.

Film magazine 2 is provided with shoulders 11' which are essentially diametrically opposed to the insertion holder 9' of receiving part 10. Moreover, film magazine 2 is provided with clamping plate 17 whose top is secured by clamping hook 16.

Receiving part 10 comprises perforation 18 to allow passage of film 19 between central bar 12 and cross beam 13.

Receiving part 10 covers opening 6 of case 1 to a great extent.

Figure 2A:
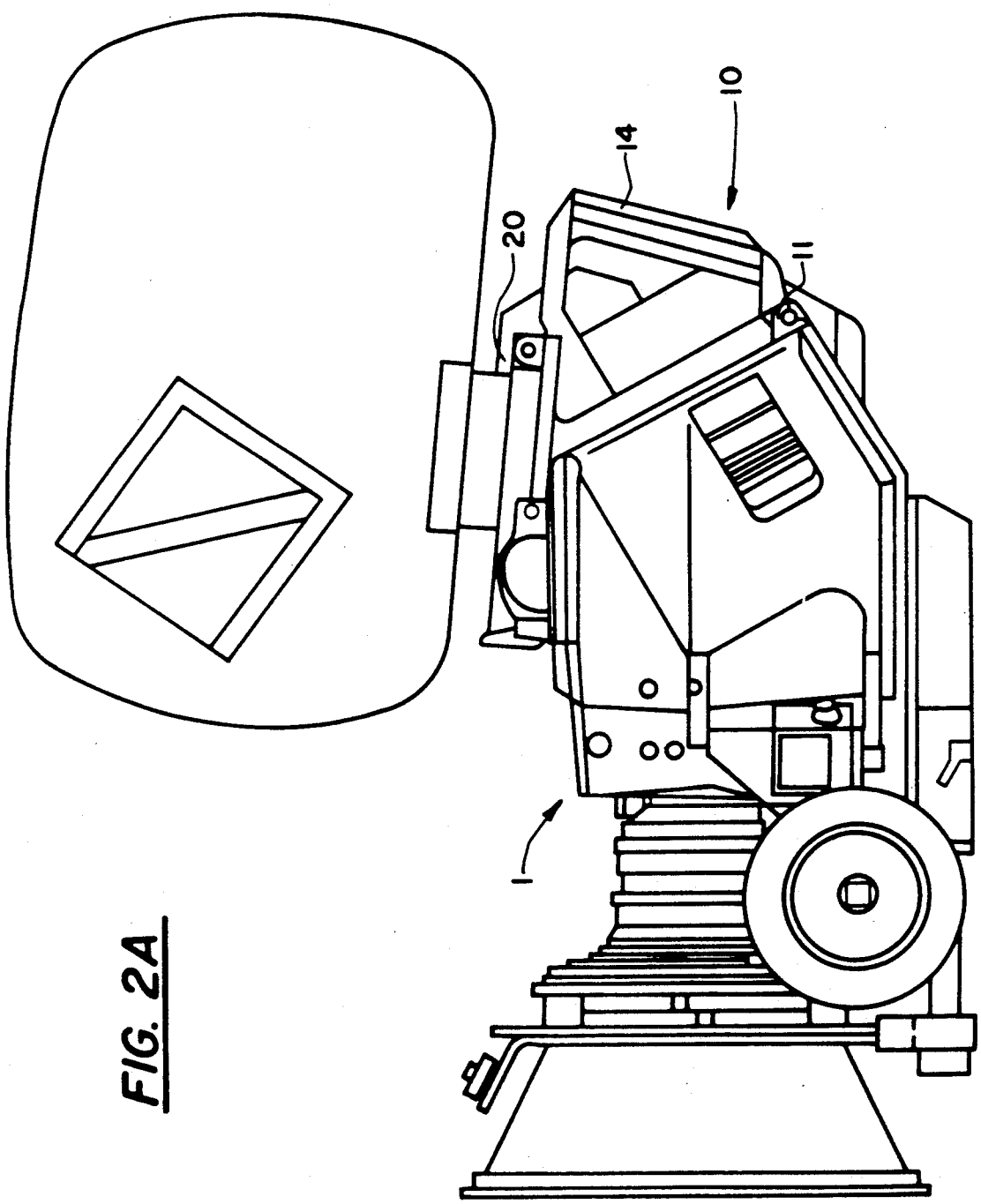
FIGS. 2A and 2B show an exploded view of a case with a receiving part according to FIG. 1.
Figure 2B:
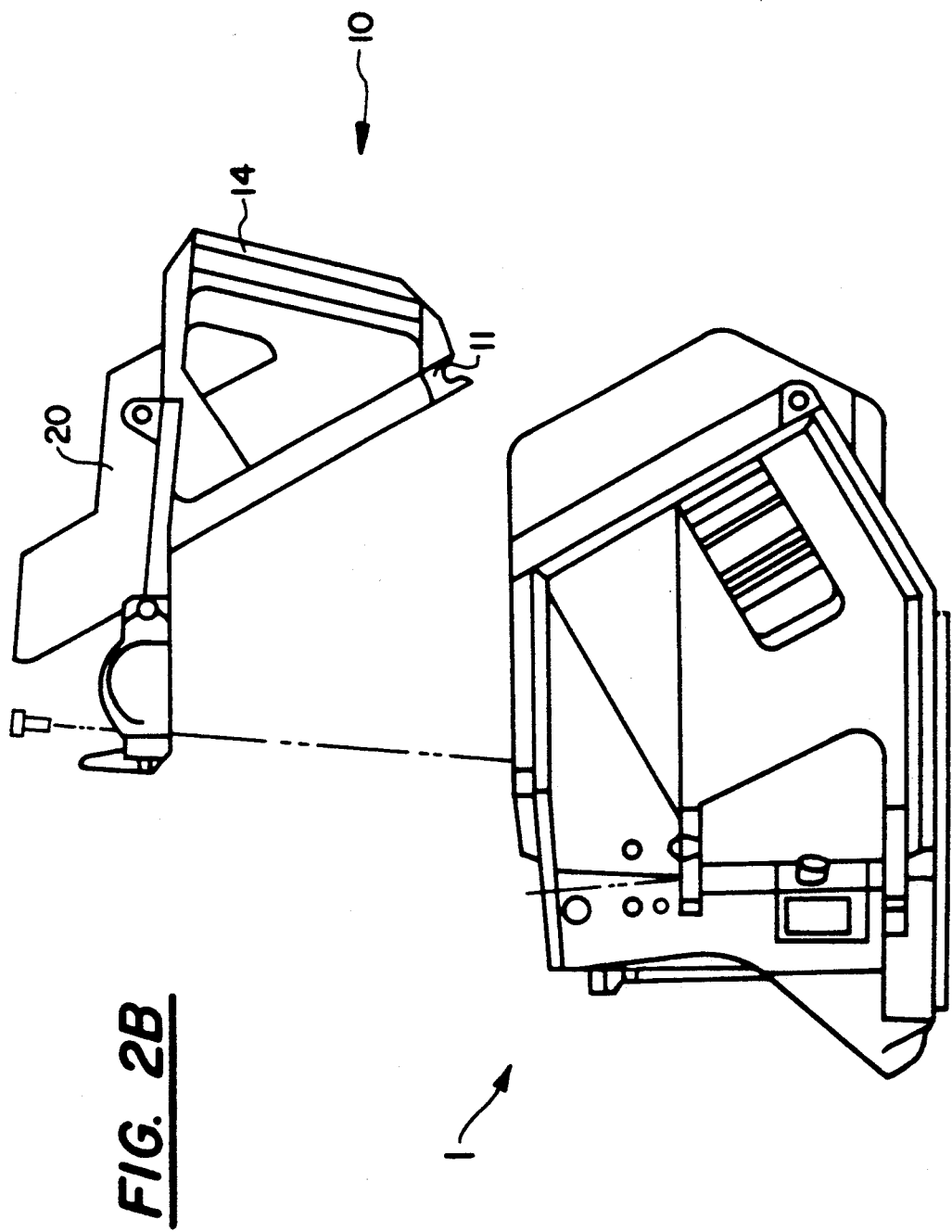

FIG. 2 shows receiving part 10 in a state in which it is lifted off from case 1. It can also be seen that receiving part 10 comprises a support 20 for film magazine 2, which is provided, as seen from FIG. 1, in a customary manner with guide rollers for film 19.

Figure 3:
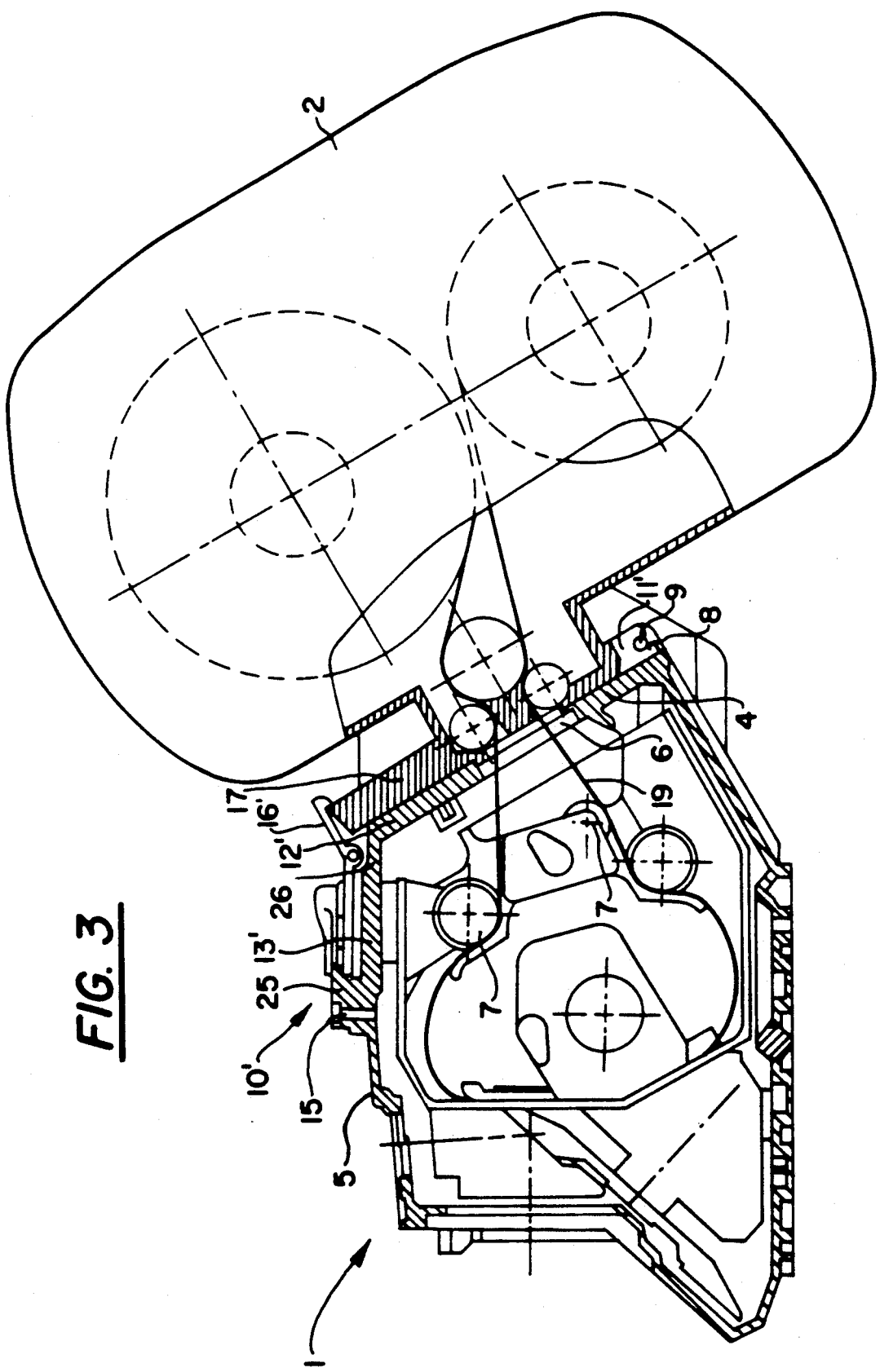
FIG. 3 shows a section of a case with a film magazine mounted on its back side.

FIG. 3 shows the same case 1 as is shown in FIG. 1; however, a receiving part 10' is mounted on case 1. The receiving part 10' is fastened to case 1, can be seen from FIG. 4, by means of two screws 15.

Receiving part 10' comprises two shanks 12' and 13' which form an angle corresponding to the angle between back wall 4 and upper wall 5. Shank 12' engages into opening 6 of case 1 and partially covers this opening.

Film magazine 2 is hooked with shoulder 11' in the insertion holder of case 1, which is formed by shaft 9, and is fixed by means of clamping hook 16', which is held on receiving part 10'.

Film 19 is guided over the guide rollers of film magazine 2 in the same manner as when film magazine 2 is position on the upper wall 5 of case 1 as in FIG. 1.

As FIG. 3 illustrates, in receiving part 10', shank 13', which rests on upper wall 5 of case 1, comprises vertical and oblique fitting areas 25 and 26 which correspond to diametrically opposed fitting areas of case 1. This arrangement acts to secure the receiving part to the case and provides an area where a screw can be inserted through the receiving part to fasten the receiving part to the case.

Figure 4A:
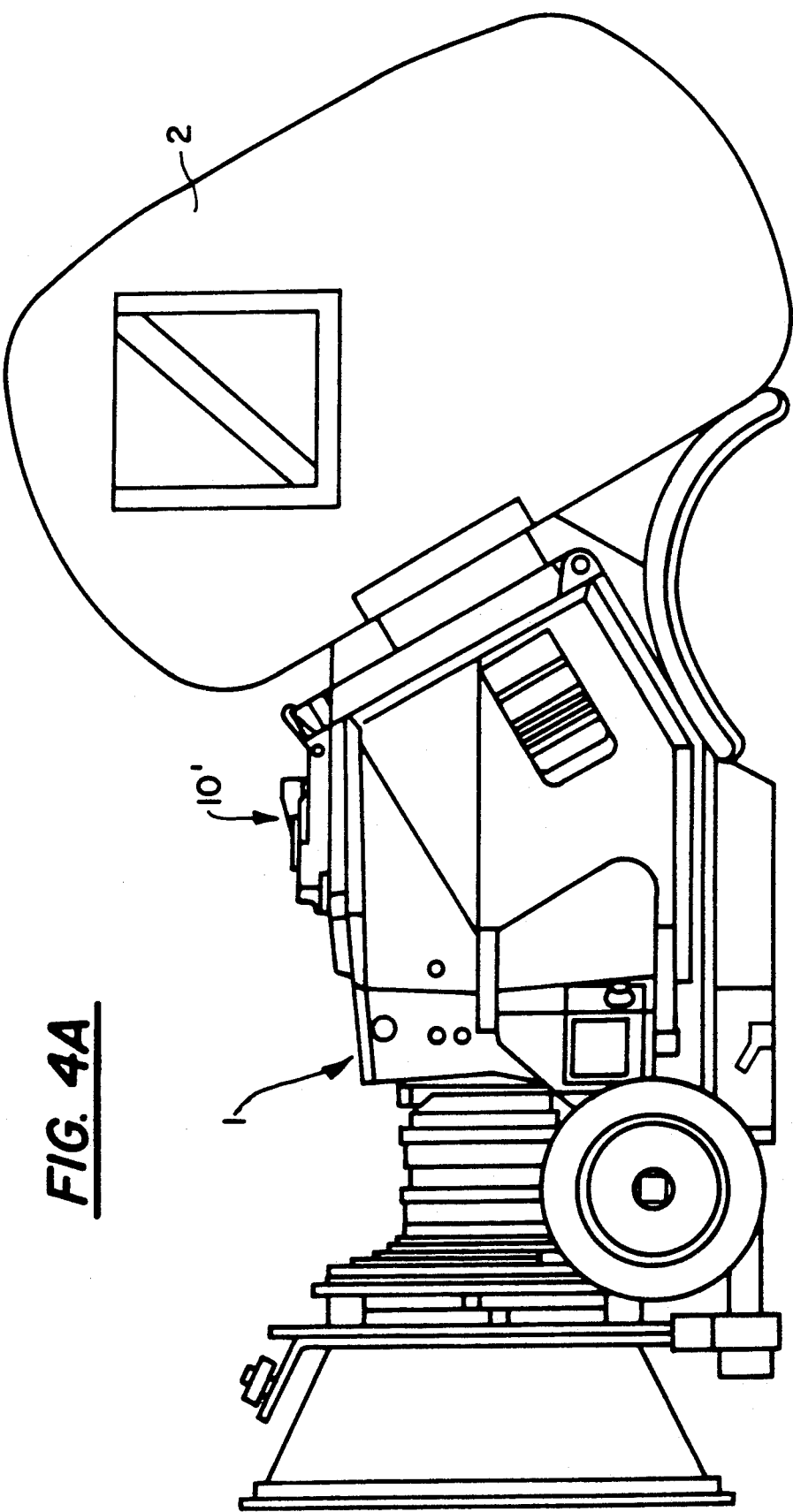
FIGS. 4A and 4B show an exploded view of a case with a receiving part according to FIG. 3.
Figure 4B:
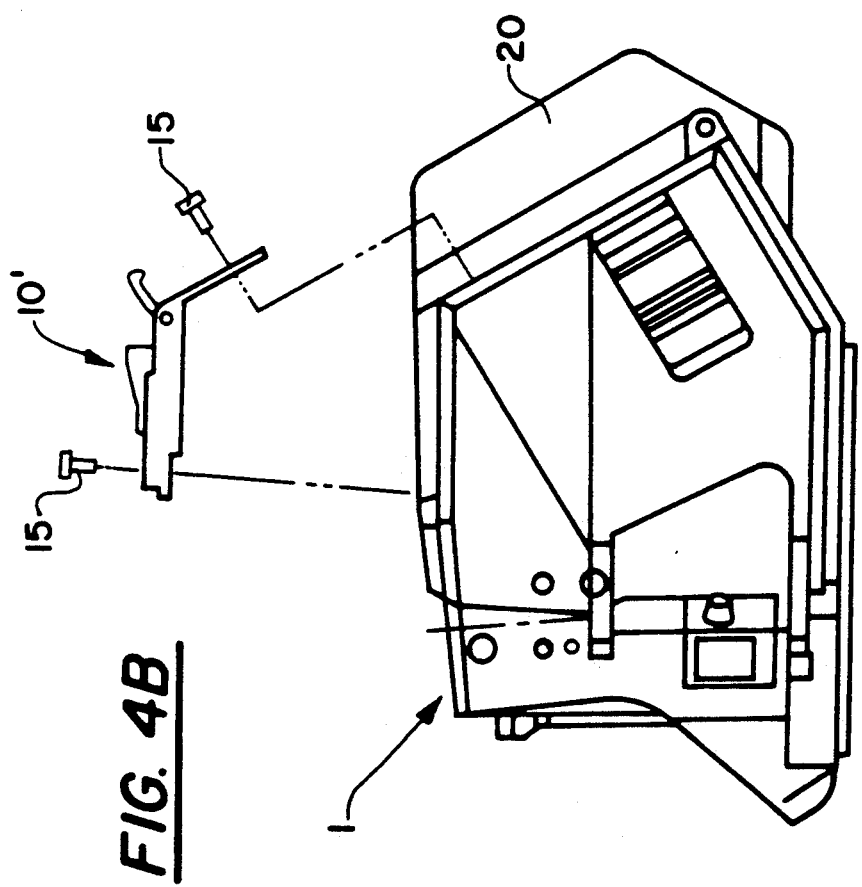

As can be seen in FIG. 4, a support 20' is also formed on receiving part 10'.

I claim:

1. A film camera housing assembly comprising:

a case having a single opening for allowing passage of film into said case, said single opening having first and second portions, first means for selectively covering said first portion of said opening but not said second portion of said opening, second means for selectively covering said second portion of said opening but not said first portion of said opening, first means for mounting a film magazine to said case over said second portion of said opening when said first covering means is covering said first portion of said opening, and second means for mounting said film magazine to said case over said first portion of said opening when said second covering means is covering said second portion of said opening, said first and second covering means, said first and second mounting means and the orientation of said first and second portions of said opening cooperating to allow said film magazine to be mounted in various orientations relative to said case.

2. A case according to claim 1, further comprising at least one screw, said screw being inserted into a tapped hole of the case for selectively securing the first and second covering means to the case.

3. A case according to claim 1 or 2, wherein one of the covering means is an angle piece with shanks forming an angle corresponding to an angle between a back wall and upper wall, of the case, one shank comprising fitting areas which cooperate with fitting areas of the case and an other shank partially covering the opening of said case.

4. A case according to claim 1 or 2, wherein one of the covering means is in a T shape, a central bar and a cross beam of said T shaped covering means forming an angle corresponding to an angle between a back wall and upper wall of the case, said T shaped covering means having an opening for allowing the passage of the film into said case.

5. A case according to claim 3, wherein one of the covering means is in a T shape, a central bar and a cross beam of said T shaped covering means forming an angle corresponding to an angle between a back wall and upper wall of the case, said T shaped covering means having an opening for allowing the passage of the film into said case.

* * * * *